United States Patent [19]
Holden et al.

[11] Patent Number: 5,726,806
[45] Date of Patent: Mar. 10, 1998

[54] APPARATUS FOR DISPLAYING A PLURALITY OF VIEWABLE IMAGES OF AN OBJECT

[75] Inventors: John Holden, Hertfordshire, England; Christoph Dobrusskin, Eindhoven, Netherlands

[73] Assignee: Central Research Laboratories Limited, Hayes, England

[21] Appl. No.: 506,881

[22] Filed: Jul. 25, 1995

[30] Foreign Application Priority Data

Aug. 5, 1994 [GB] United Kingdom ............... 9415894

[51] Int. Cl.⁶ .................................................. G02B 27/14
[52] U.S. Cl. .................................................. 359/630; 359/633
[58] Field of Search ........................... 359/630, 631, 359/632, 633, 634, 636, 638; 345/7, 8, 9

[56] References Cited

U.S. PATENT DOCUMENTS

| | | | |
|---|---|---|---|
| 3,200,702 | 8/1965 | Giordano | 359/630 |
| 3,620,592 | 11/1971 | Freeman | 359/631 |
| 3,657,981 | 4/1972 | Benton | 354/112 |
| 3,767,305 | 10/1973 | Craven | 356/71 |
| 3,832,038 | 8/1974 | Johnson | 359/799 |
| 4,200,366 | 4/1980 | Freeman | 353/78 |
| 4,348,185 | 9/1982 | Breglia | 434/43 |
| 4,509,837 | 4/1985 | Kassies | 353/10 |
| 5,189,452 | 2/1993 | Hodson | 353/94 |
| 5,321,572 | 6/1994 | Fergason | 359/630 |
| 5,408,346 | 4/1995 | Trissel | 359/65 |
| 5,418,584 | 5/1995 | Larson | 353/122 |
| 5,572,229 | 11/1996 | Fisher | 345/8 |
| 5,572,363 | 11/1996 | Fergason | 359/630 |
| 5,583,695 | 12/1996 | Dobrusskin | 359/633 |

FOREIGN PATENT DOCUMENTS

WO 82/00911   3/1982   WIPO.

*Primary Examiner*—David C. Nelms
*Assistant Examiner*—Ricky Mack

[57] ABSTRACT

An apparatus for displaying an image comprises a) a retroreflective screen, b) a polarising beam-splitter making an oblique angle with the screen, c) a device for projecting light from an image or object toward the screen through the beam-splitter, and d) a partially reflective light transmissive sheet being provided at an oblique angle to the beam-splitter such that the sheet may be view through the beam-splitter. The apparatus may be used as a head up display in which real and virtual images in respective positions may be viewed.

16 Claims, 2 Drawing Sheets

U.S. Patent     Mar. 10, 1998     Sheet 1 of 2     5,726,806
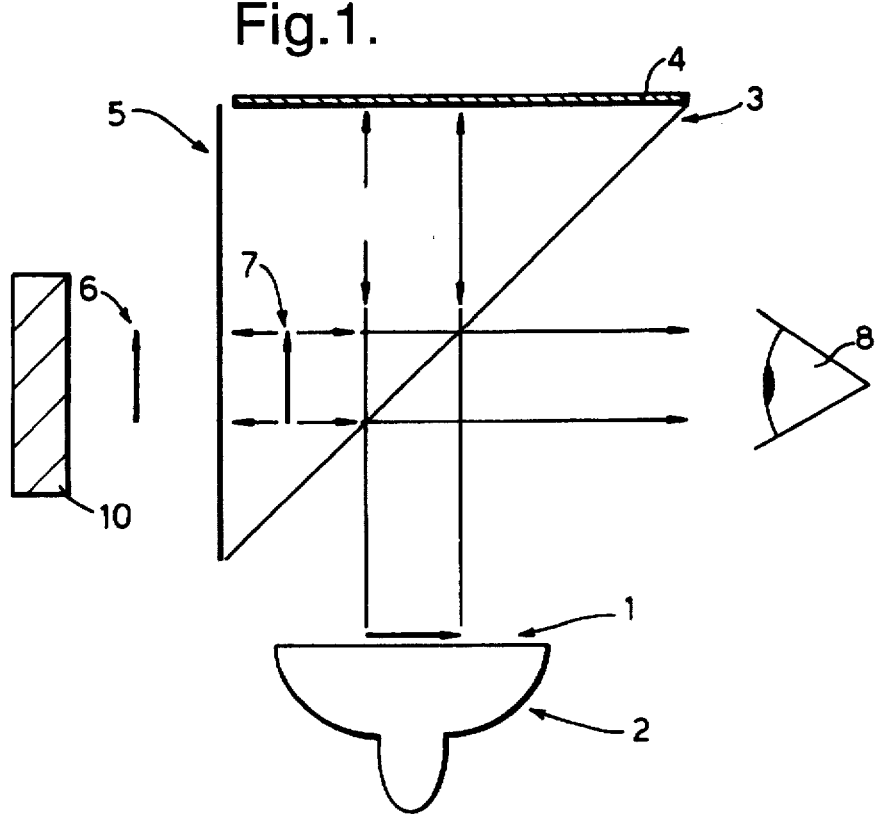
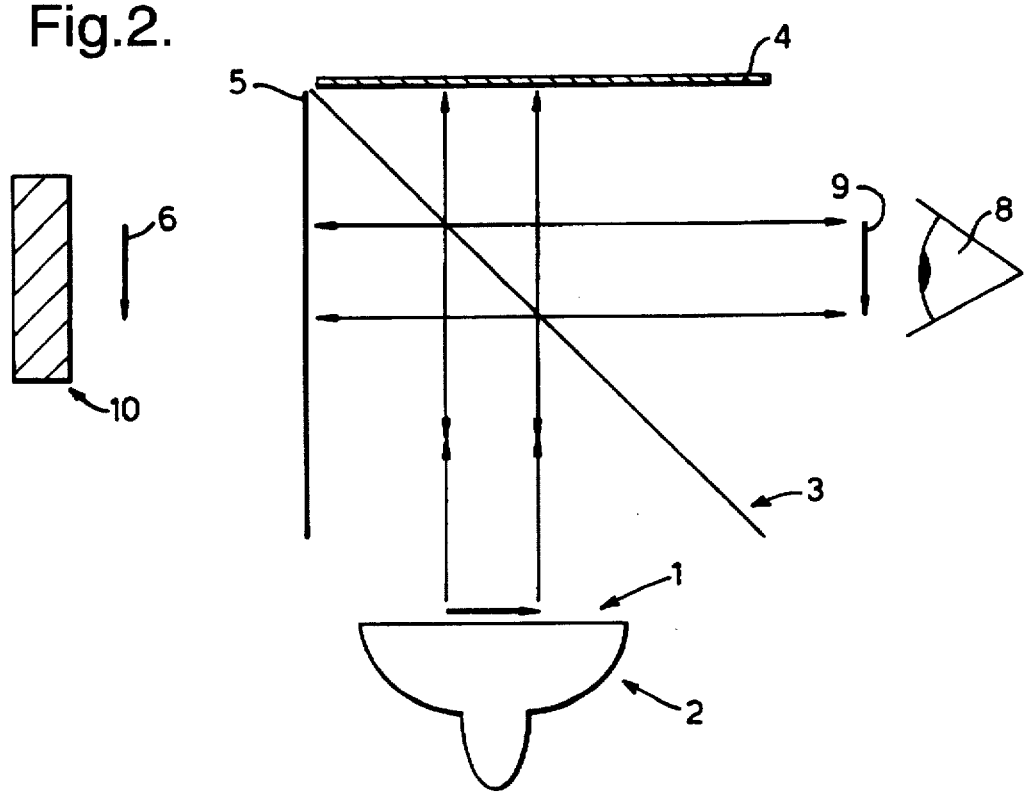

1

APPARATUS FOR DISPLAYING A PLURALITY OF VIEWABLE IMAGES OF AN OBJECT

BACKGROUND OF THE INVENTION

1. Field of the Invention

This invention relates to an apparatus for displaying an image of an object, comprising a beam-splitter positioned in a path of light from the object, and a direction selective screen positioned in a path of light from the object which has been transmitted or reflected by the beam-splitter.

2. Description of Related Art

In a known apparatus for displaying a real image disclosed in PCT patent application number WO 82/00911, an illuminated object is positioned at the top of a three sided rectangular box. The side of he box towards the observer is open, the side away from the observer is opaque, and the base is a direction-selective screen in the form of a layer of retroreflective material. A beam-splitter is positioned at a 45 degree angle to all three sides such that it makes an oblique angle with the layer of retroreflective material. The beam-splitter is thus positioned in a path of light from the object, and the retroreflective screen is positioned in a path of light from the object which has been reflected by the beam-splitter. A real image (which may be 3-dimensional) appears to the observer to be suspended in space in front of the beam-splitter. A disadvantage of this prior art device is that virtual and/or multiple images are not displayed. The image is also not displayed superimposed upon a scene viewed by an observer and therefore can not be used in applications such as head-up displays or methods of aiming.

SUMMARY OF THE INVENTION

According to a first aspect of the invention there is provided an apparatus as defined in the first paragraph above, characterized in that it further comprises a partially reflective light-transmissive sheet positioned in a path of light from the object which has been transmitted or reflected by the beam-splitter such that a plurality of viewable images are formed of the object.

This apparatus gives the ability to display a virtual image in addition to the real image. The virtual image is in general in a different plane to that of the real image.

Preferably, the beam-splitter is a polarizing beam-splitter. This can give the advantage of a greater image brightness. This is most apparent when polarized light is used.

Advantageously, the apparatus further comprises means to change the sense of the circular polarization of the light travelling towards the beam-splitter from one handedness to the other in synchronism with a change in the image being projected. This gives the advantage that two different images may be displayed apparently simultaneously.

According to a second aspect of the invention, the above apparatus is modified be replacing the partially reflective light transmissive sheet by a mirror.

BRIEF DESCRIPTION OF THE DRAWINGS

Embodiments of the invention will now be described, by way of example only, with reference to the accompanying diagrammatic drawings, in which FIG. 1 shows a first embodiment of apparatus according to the invention.

FIG. 2 shows a second embodiment, and

In the above Figures, similar elements have been labelled with the same numeral where possible.

BRIEF DESCRIPTION OF THE DRAWINGS

Figure 3:
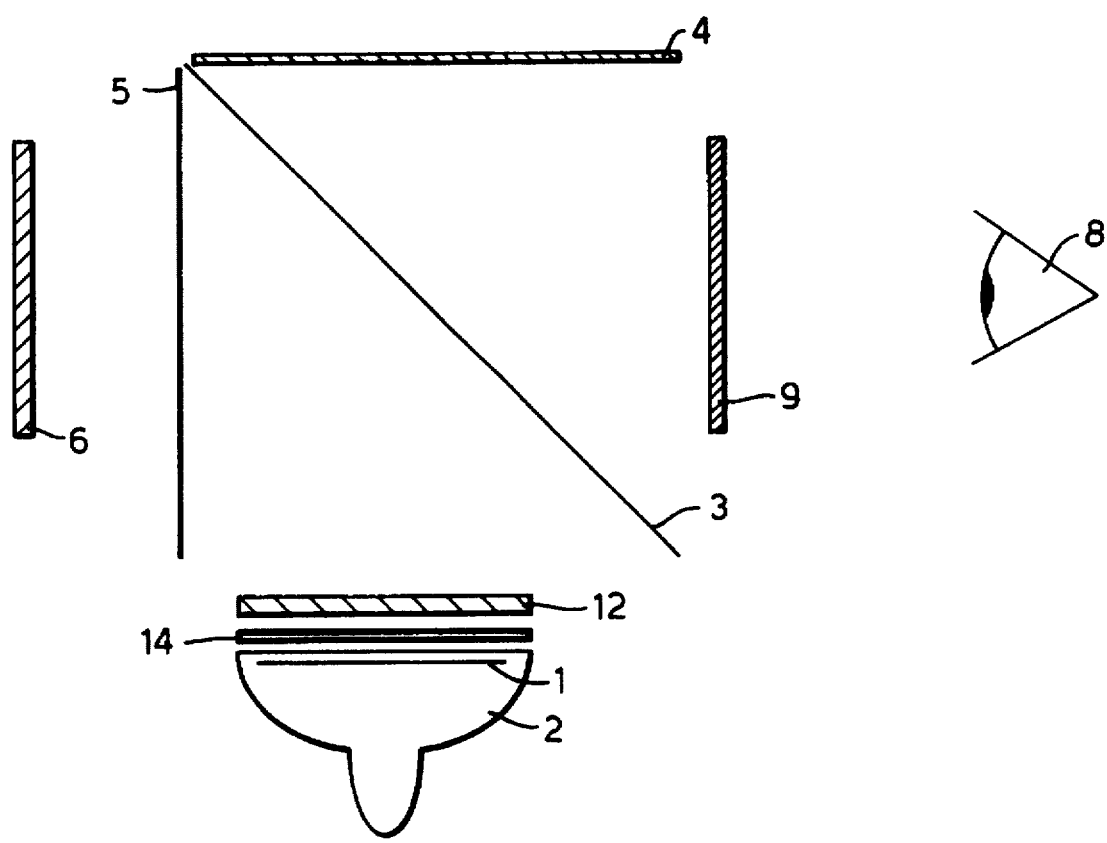
FIG. 3 shows a third embodiment.

In FIG. 1, apparatus for displaying an image of an object (1) to an observer (8), comprises a direction-selective screen (4) made from a sheet of corner-cube retroreflectors which is arranged to face he image. A beam-splitter (3) consisting of a layer of molecularly aligned cholesteric liquid crystal material (in the present case Wacker LC-Silicones CC4053L (Green) AB292 supplied by Consortium, fur Electrochemische Industrie GmbH, Munich) is positioned at a 45° angle to the retroreflective screen (4) and the light from the image (1). Display means (2) in the form of a CRT screen is used for providing the object (1), in the present case itself an image, and light travels from the object (1) towards the screen (4) through the beam-splitter (3). Thus the beam-splitter is positioned in a path of light from the object and the direction selective screen is positioned in a path of light which has been transmitted the beam-splitter. A partially reflective light-transmissive sheet (5), in the form of a half-silvered mirror, is positioned at an oblique angle (45°) to the beam-splitter (3), in a path of light from the object which has been reflected by the beam-splitter, and is placed perpendicular to the direction-selective screen (4). In this arrangement the half-silvered mirror may be viewed through the beam splitter by the observer (8). In this embodiment the observer sees a real image (7) and a virtual image (6). As the beam-splitter (3) and half-silvered mirror (5) are both partially transparent, the observer will also see any other objects or images (10) present in the background behind the apparatus. Thus the apparatus may be used as ahead-up display. In general, each image lies in a different plane.

In a second embodiment, shown schematically in FIG. 2, the only difference is that the beam-splitter (3) has been rotated by a quarter turn about an axis perpendicular to the page. This gives a real image (9) and a virtual image (6), with a greater spacing between them than images 6 and 7 in FIG. 1. In all other respects the apparatus in the two examples is identical. Note however that in this example the handedness of the images 6 and 9 is reversed with respect to those observed in the first example above. In both figures the real and virtual images point in the same direction.

A third embodiment is shown in FIG. 3. In this embodiment, polarising means is provided to change the polarization state of the light projected towards the beam-splitter (3). In the present embodiment this comprises an electrically switchable retardation plate 12 consisting of a ferroelectric liquid crystal cell between two electrodes. The liquid crystal has a birefringence Δn and thickness d which satisfy the equation $$d\Delta n/\lambda = \tfrac{1}{2}$$

λ preferably corresponds to the peak reflectance wavelength for the aligned cholesteric liquid crystal incorporated in the polarizing beam-splitter 3 (in the present case d is about 1.4 microns and the peak reflection wavelength is about 550 nm). The apparatus also comprises a circular polariser 14 to circularly polarise the light emitted from the image 1 on the CRT screen 2.

In this example it is possible to switch the handedness of the polarisation sate of the light impinging upon the CLC beam-splitter 3. This light is substantially reflected in the present embodiment when it is left hand circularly polarised and substantially transmitted by the beam-splitter when it is right hand circularly polarised. Right hand circularly polarised light which is transmitted by the beam-splitter 3 travels towards the retroreflector array 4. On reflection it is transformed into left hand circularly polarised light which travels back towards the beam-splitter and is then substantially reflected by the beam-splitter to form the real image 9. If the retardation plate is then switched such that left hand circularly polarised light travels towards the beam-splitter, it is reflected towards the partially light-transmissive reflective sheet 5. This light will be partially reflected by the sheet 5, and is transformed on the reflection into right-hand polarised light, which travels back towards the beam-splitter and is this time transmitted to form a virtual image 6 visible to an observer 8.

In two different images are displayed one after the other on the CRT 2 and the retardation plate is switched in synchrony with the change from one to the other, light from the first image will always exhibit the same handedness of circular polarisation, and this will be a different handedness to light from the second image. Thus one image will always be retroreflected and appear as a real image 9 in front of the beam-splitter, whilst the other image will always be simply reflected by the sheet 5 and from a virtual image 6 behind the beam-slitter at a different apparent distance from the observer 8 to that of the first image. If the CRT image and half-wave retardation plate are both switched in synchrony at a frequency above a critical fusion frequency for the observer 8 (say for example 100 Hz), then the observer will see two images (which may be different or the same if the CRT is in fact not switched or is switched to show the same image) at different distances continuously and simultaneously.

Although in the above examples, a sheet of corner-cute retroreflector has been used as the direction selective screen, other retroreflective or autocollimating screens such as lenticular screens or microlens arrays may be used.

Although a beam-splitter in the form of a sheet of molecularly aligned cholesteric liquid crystal has been described, other polarisation splitters or other beam-splitters, such as for example a half-silvered mirror may be used as an alternative in the above examples shown in FIGS. 1 and 2. Only polarisation splitters will work however in the example shown in FIG. 3.

The use of a half silvered mirror will however substantially reduce the apparent brightness of the images in FIG. 1 and in FIG. 2.

Although in the above examples, the object has been provided by a CRT screen, any illuminated object or means for displaying images such as LCD displays or rear projection systems may be used.

In a modification of the above embodiments, the partially reflective light-transmissive sheet may be replaced by a mirror. This embodiment may not be used as a head up display as it is not light-transmissive. A dichroic mirror could also be used as an alternative as this will reflect in only a narrow wavelength range and therefore may be considered to be partially reflective. Fresnel reflection from a transparent sheet such as the wind screen of an aircraft or car may also be used as an alternative. The partially reflective light-transmissive sheet need not be planar.

In the above examples, the distance from the object (1) to the beam-splitter determines the position of the images. The direction selective screen can be moved without altering the position of the images. In FIG. 1, reducing the distance between the object (1) and the beam-splitter (3) will make images 6 and 7 both move closer to the light transmissive sheet (5).

In FIG. 1, moving the partially reflective light transmissive sheet 5 towards the observer 8 will result in the real image 7 moving closer to the observer, but the other image will not move. In FIG. 2, moving the sheet 5 towards the observer 8 will result in the real image staying in the same lace and the virtual image 6 moving closer to the observer.

In all the above examples, angling either sheet 5 or sheet 3 or both will result in the images changing their apparent positions. This effect enables the apparatus to be used for aiming or alignment.

What is claimed is:

1. An apparatus for displaying an image of an object, comprising a beam-splitter positioned in a path of light from the object, and a direction selective screen positioned in the path of light from the object after transmission by the beam-splitter, characterized in hat the apparatus further comprises a partially reflective light-transmissive sheet positioned in the path of light from the object after reflection by the beam-splitter such that a plurality of viewable images are formed of the object.

2. A modification of the apparatus according to claim 1 in which the partially reflective light transmissive sheet is replaced by a mirror.

3. An apparatus as claimed in claim 2 comprising a head-down display.

4. An apparatus according to claim 2 in which the direction-selective screen comprises a retroreflective material.

5. An apparatus according to claim 2 in which the direction-selective screen comprises a retroreflective material.

6. An apparatus as claimed in claim 5 further comprising means for changing the sense of circular polarization of the light travelling towards the beam-splitter from one of right or left handedness to the other of said right or left handedness.

7. An apparatus as claimed in claim 6 in which the polarization state of the light is carried in synchrony with a variation in the image being projected.

8. An apparatus as claimed in claim 7 in which the polarization state of the light is varied at a frequency above a critical fusion frequency for the observer.

9. An apparatus as claimed in claim 1 in which the viewable images are superimposed upon a scene viewed by an observer though at least one of he beam-splitter and the partially reflective light transmissive sheet.

10. An apparatus as claimed in claim 1 consisting a head-up or head-down display.

11. An apparatus according to claim 1 in which the direction-selective screen comprises a retroreflective material.

12. An apparatus according to claim 1 in which the beam-splitter is a polarisation splitter.

13. An apparatus as claimed in claim 12 further comprising means for changing the sense of circular polarisation of the light travelling towards the beam-splitter from one of right or left handedness to the other of said right or left handedness.

14. An apparatus as claimed in claim 13 in which the polarization state of the light is varied in synchrony with a variation in the image being projected.

15. An apparatus as claimed in claim 14 in which the polarization state of the light is varied at a frequency above a critical fusion frequency for the observer.

16. An apparatus as claimed in claim 1 in which each of he plurality of images lies in a different plane.

* * * * *